(12) United States Patent
Simske et al.

(10) Patent No.: US 8,593,698 B2
(45) Date of Patent: Nov. 26, 2013

(54) VOID PANTOGRAPHS AND METHODS FOR GENERATING THE SAME USING AT LEAST ONE TEST VOID PANTOGRAPH

(75) Inventors: Steven J. Simske, Fort Collins, CO (US); Jason S. Aronoff, Fort Collins, CO (US); Malgorzata M. Sturgill, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 223 days.

(21) Appl. No.: 13/148,818

(22) PCT Filed: Feb. 26, 2009

(86) PCT No.: PCT/US2009/035359
§ 371 (c)(1),
(2), (4) Date: Aug. 10, 2011

(87) PCT Pub. No.: WO2010/098760
PCT Pub. Date: Sep. 2, 2010

(65) Prior Publication Data
US 2011/0310404 A1    Dec. 22, 2011

(51) Int. Cl.
*G06K 15/02*  (2006.01)
(52) U.S. Cl.
USPC .......... 358/3.28; 382/100; 382/137; 382/162; 382/232; 382/305; 382/306
(58) Field of Classification Search
USPC ......... 358/3.28; 382/100, 137, 162, 232, 305, 382/306
See application file for complete search history.

(56) References Cited

U.S. PATENT DOCUMENTS

| | | | |
|---|---|---|---|
| 5,575,508 A | 11/1996 | Diamond | |
| 5,785,353 A | 7/1998 | Diamond | |
| 5,788,285 A | 8/1998 | Wicker | |
| 5,873,604 A | 2/1999 | Phillips | |
| 6,185,001 B1 | 2/2001 | Webendorfer et al. | |
| 6,363,162 B1 | 3/2002 | Moed | |
| 7,270,918 B2 | 9/2007 | Blood et al. | |
| 7,376,264 B2 * | 5/2008 | Loce et al. | 382/162 |
| 2002/0126891 A1 | 9/2002 | Osberger | |
| 2005/0058476 A1 | 3/2005 | Murakami | |
| 2005/0142468 A1 | 6/2005 | Blood et al. | |
| 2005/0162682 A1 | 7/2005 | Aritomi | |
| 2006/0268311 A1 | 11/2006 | Tamaru | |
| 2007/0003294 A1 | 1/2007 | Yaguchi | |
| 2007/0081841 A1 | 4/2007 | Nakano | |
| 2007/0133059 A1 | 6/2007 | Hu | |
| 2007/0241554 A1 | 10/2007 | Wicker | |
| 2007/0246930 A1 | 10/2007 | Wicker | |
| 2008/0301767 A1 | 12/2008 | Picard et al. | |
| 2009/0034825 A1 | 2/2009 | Simske et al. | |

FOREIGN PATENT DOCUMENTS

JP    2005-236954    9/2005

OTHER PUBLICATIONS

International Search Report and Written Opinion for PCT/US2009/035359 dated Nov. 2, 2009 (13 pages).

\* cited by examiner

*Primary Examiner* — Qian Yang

(57) ABSTRACT

A void pantograph and a method for generating the same are disclosed herein. The void pantograph includes a foreground portion based on a region of an image that is defined using a predetermined filter, and a background portion based on another region of the image that is defined using the predetermined filter.

15 Claims, 5 Drawing Sheets

VOID PANTOGRAPHS AND METHODS FOR GENERATING THE SAME USING AT LEAST ONE TEST VOID PANTOGRAPH

BACKGROUND

The present disclosure relates generally to void pantographs and methods for generating the same.

Void pantographs are used to create copy-evident backgrounds for a variety of security documents. Some prominent examples of void pantographs are those that are used as backgrounds for checks, which, for example, display "VOID" or "COPY" on the reproduced image. Void pantographs may be used for packaging, labels, documents, or the like. In general, pantograph approaches may be used to hide in plain sight a variety of other information that can be read and acted upon.

BRIEF DESCRIPTION OF THE DRAWINGS

Features and advantages of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The void pantographs disclosed herein are generated from digital images of any desirable object. These void pantographs, resulting from image transformations, may be used to encode digital data therein. As such, the void pantographs disclosed herein may advantageously be used simultaneously for steganographic, copy prevention, and security payload carrier roles.

Figure 1:
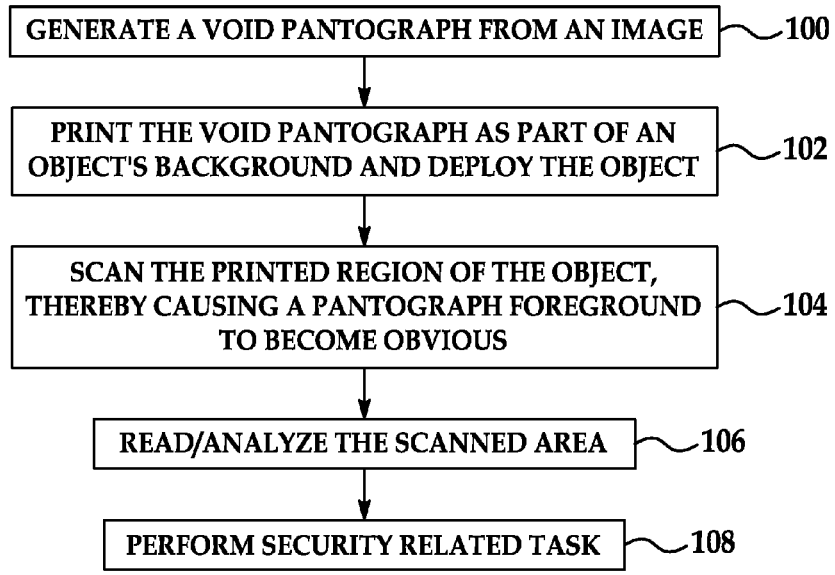
FIG. 1 is a flow diagram depicting an embodiment of a method for generating and using a void pantograph.

Referring now to FIG. 1, an embodiment of the method for using the void pantographs disclosed herein is depicted. Very generally, the method includes, generating the void pantograph from an image, as shown at reference numeral 100; printing the void pantograph as part of an object's background and deploying the object, as shown at reference numeral 102; scanning the printed region of the object, thereby causing a foreground of the pantograph to become patent or overt (i.e., visibly distinguishable from the pantograph background and the object foreground), as shown at reference numeral 104; reading and analyzing the scanned area/region, as shown at reference numeral 106; and performing one or more security related tasks based upon the reading and analysis, as shown at reference numeral 108. Each of the steps depicted in FIG. 1 will be described in further detail hereinbelow in reference to one or more of the other Figures.

Figure 2A:
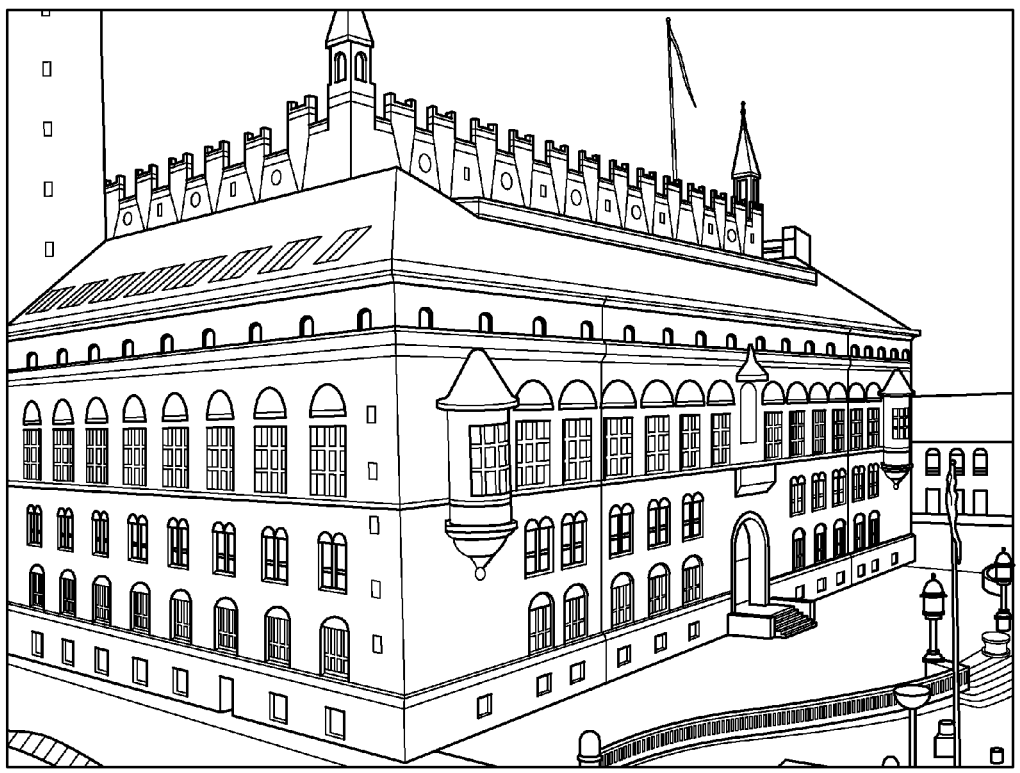
FIG. 2A is a schematic representation of an image.
Figure 2B:
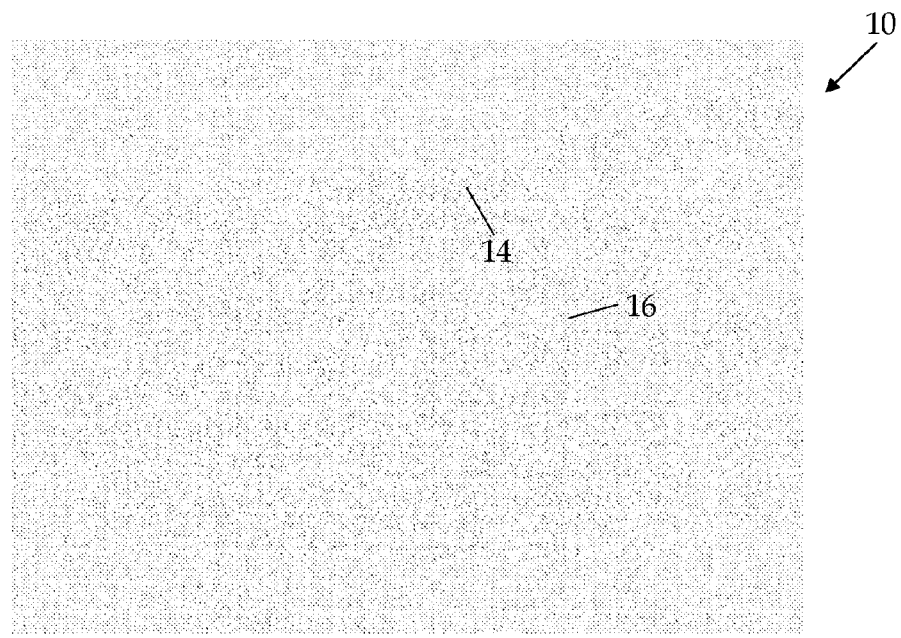
FIG. 2B depicts a void pantograph formed via the image of FIG. 2A after the void pantograph has been printed.
Figure 2C:
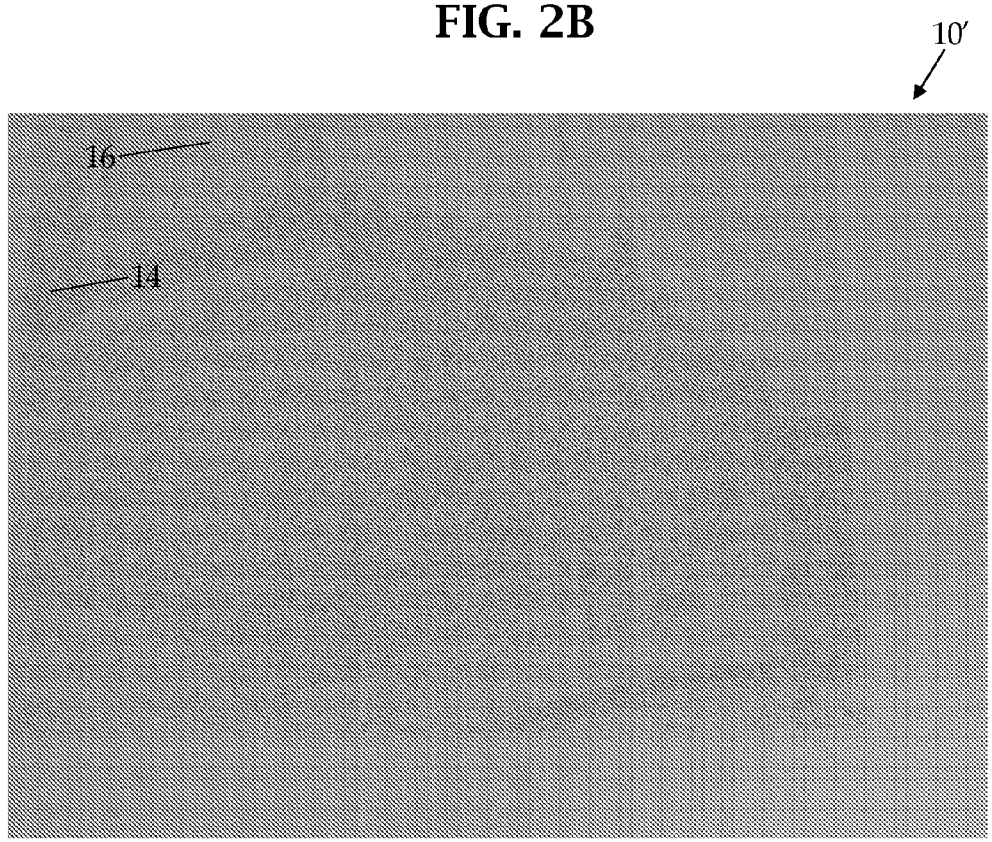
FIG. 2C depicts the void pantograph of FIG. 2B after the void pantograph has been scanned.

The step of generating the void pantograph 10, 10' (see, e.g., FIGS. 2C and 2D) is schematically depicted in FIGS. 2A through 2C. The void pantograph 10, 10' is generated from an image 12, a schematic non-limiting example of which is shown in FIG. 2A. The image 12 may be any digitized image, including an image captured with a digital camera, camcorder, or scanner. The image 12 may also be produced by imaging software, graphics software, or the like. The image 12 may be any desirable image, and in some instances, may incorporate text, shapes, glyphs, embedded information to initiate, instantiate, continue, complete, etc. any document/printed material associated workflow(s) (i.e., anything that is initiated via correct reading of the void pantograph), security applications, or other information that can be read and interpreted.

The image 12 is filtered using one or more filters. Non-limiting examples of such filters include an edge filter (e.g., Sobel, Canny, Laplace, neighborhood variance, gradient, etc.), a color filter, a hue filter, a chroma filter, a saturation filter, a brightness filter, an intensity filter, a luminance filter, a texture filter, a local entropy filter, a graininess filter, a specific shape filter, a threshold (Otsu, etc.) filter, a sharpness filter, a convolution filter, or other imaging filters. It is to be understood that one of the filters may be selected to filter the image 12, or multiple filters may be selected to filter the image 12. The filter(s) designate one or more areas for a pantograph foreground 14 (see FIG. 2C) and a pantograph background 16 (see FIG. 2C) based upon the particular attribute associated with the filter. For example, if an edge filter is selected to filter the image 12, the filtering process will identify edge pixels and non-edge pixels. The filtered pixels are then assigned to the pantograph foreground 14 or background 16, depending, at least in part, on which pixels are suitable for forming the respective regions of the pantograph 10, 10'. Such foreground and background pixels may be selected automatically or by printing samples of both and selecting based on the printed samples. In an embodiment, the higher information areas (e.g., higher edge content or image entropy or image high frequency content) are separated from the lower information areas to make a good void pantograph image. In the example involving the edge filter, the edge pixels may be assigned to the pantograph foreground 14, and the non-edge pixels may be assigned to the pantograph background 16.

As used herein, the phrase "pantograph foreground" refers to the portion of the pantograph 10, 10' that is covert or semi-covert after being printed on an object (see FIG. 2B), but that becomes patent or overt after the printed region of the object is scanned (see FIG. 2C). In other words, the pantograph foreground 14 may be visible to the human eye upon close inspection after printing (FIG. 2B), but is virtually indistinguishable from both the pantograph background 16 and the object foreground (not shown). Also as used herein, the phrase "pantograph background" refers to the portion of the pantograph 10, 10' that is covert or semi-covert after being printed on an object (see FIG. 2B), and remains visually the same after the printed region of the object is scanned (see FIG. 2C).

Once the areas of the image 12 are identified as being suitable for the pantograph foreground 14 or pantograph background 16, the characteristics of each of the foreground 14 and background 16 may be manipulated, altered, etc. in order to determine a desirable combination of deployment characteristics for the resulting pantograph 10, 10'. Deployment characteristics include the settings (e.g., dot size, dot shape, dot orientation, dot color, a dot distribution method, a dot spacing pattern, a printer to be used, a substrate to be used, etc.) that are used to generate the final pantograph 10, 10' that will be deployed on an object.

In one embodiment, desirable pantograph background 16 settings are selected and then are set. Once the desirable background 16 settings are determined, the foreground 14 characteristics may be readily altered to determine which foreground 14 and background 16 combination provides the most desirable pantograph 10, 10' (both after printing and after scanning). It is to be understood that desirable foreground 14 characteristics may also be selected and made static while multiple background 16 characteristics are tested. In either instance, maintaining static characteristics for one of the pantograph foreground or background 14, 16 enables the other of the pantograph background 16 or foreground 14 characteristics to be readily tested. The various combinations of pantograph foregrounds 14 and backgrounds 16 that are evaluated are referred to herein as test pantographs TP (one non-limiting example of which is shown, after scanning, in FIG. 3). The test pantographs TP include the foreground 14 and background 16 just like the void pantographs 10, 10', except that the test pantographs TP are used to experiment with different characteristics in order to determine the best characteristics for deployment of the actual void pantograph 10, 10'.

While not shown, it is to be understood that multiple test pantographs TP may be employed in a single test sheet for testing a plurality of pantograph foreground 14 and background 16 pairings. As one non-limiting example, Table 1 below illustrates various foreground 14 and background 16 pairings for a test sheet including 63 test pantographs TP. In this example, the black pixel percent coverage is shown for each pairing, where the first number is the foreground percentage, and the second number is the background percentage. As shown, multiple static foreground pixel percent coverage values are tested with varying background pixel percent coverage values.

Figure 4:
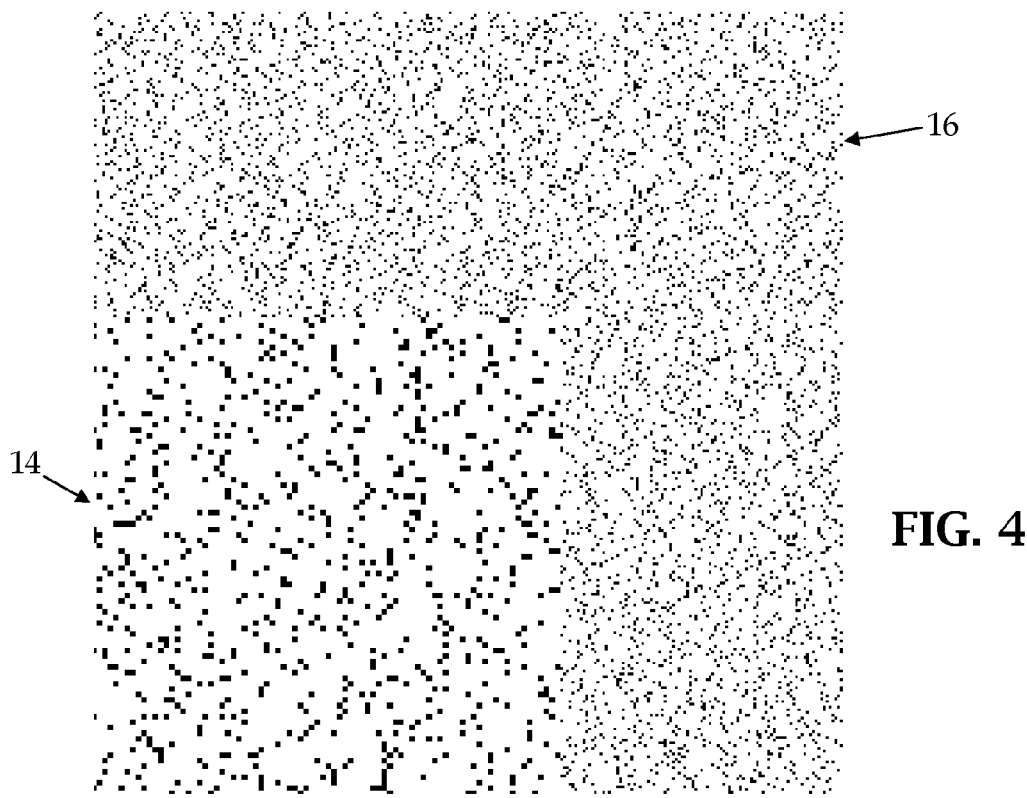
FIG. 4 is an enlarged view of a portion of the test void pantograph of FIG. 3, where, in this example representation, the test void pantograph is printed with different dot sizes at the same black pixel density.
Figure 5:
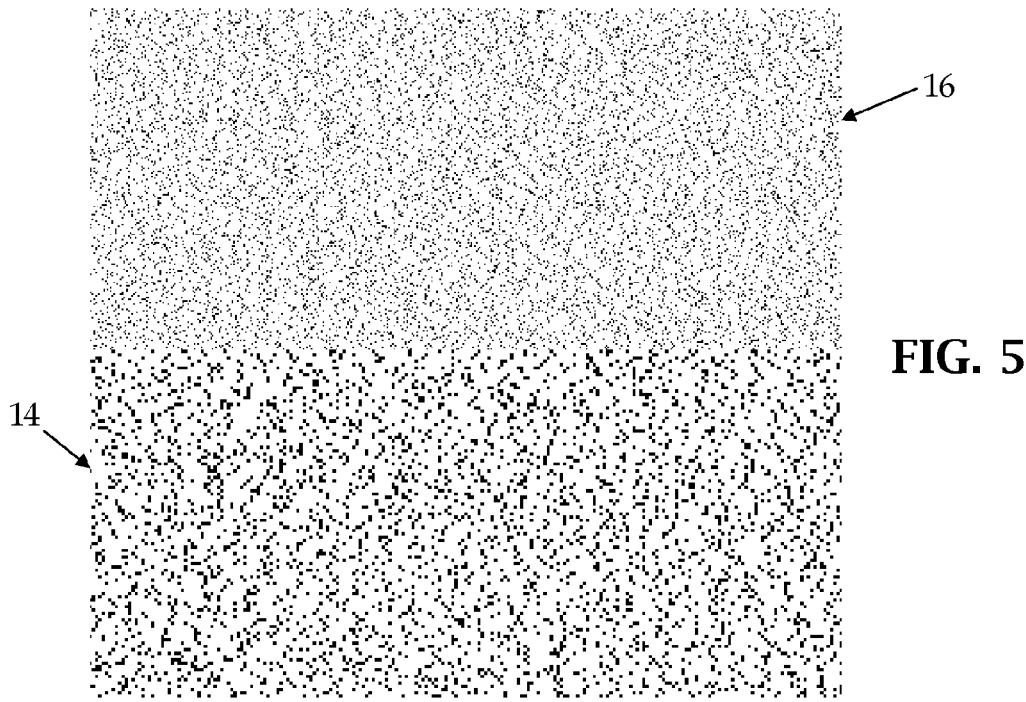
FIG. 5 is an enlarged view of a portion of the void pantograph of FIG. 3, where, in this example representation, the test void pantograph is printed with different dot sizes and different black pixel densities.
Figure 6:
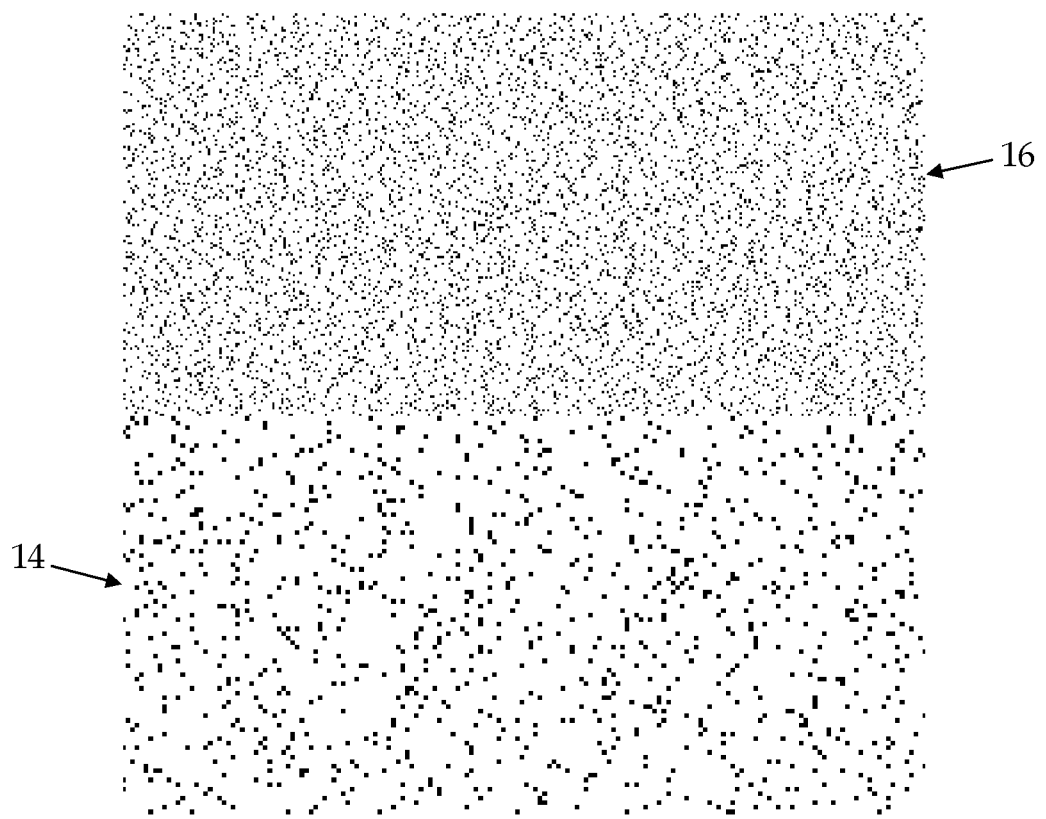
FIG. 6 is an enlarged view of the portion of FIG. 5 of the test void pantograph of FIG. 3, where, in this example representation, the void pantograph is also printed with different dot sizes and different black pixel densities.

In a non-limiting example, the test pantographs TP are binary, and are generated using differential dot sizes and differential black pixel concentrations. The exploded versions of such test pantographs TP are shown in FIGS. 4-6. While these characteristics are used herein for illustrative purposes, it is to be understood that other characteristic constructions may be used. For example, dot shape, dot orientation, dot density, dot color, dot distribution, dot spacing patterns, or combinations thereof may be used to generate the various test pantographs TP.

Figure 3:
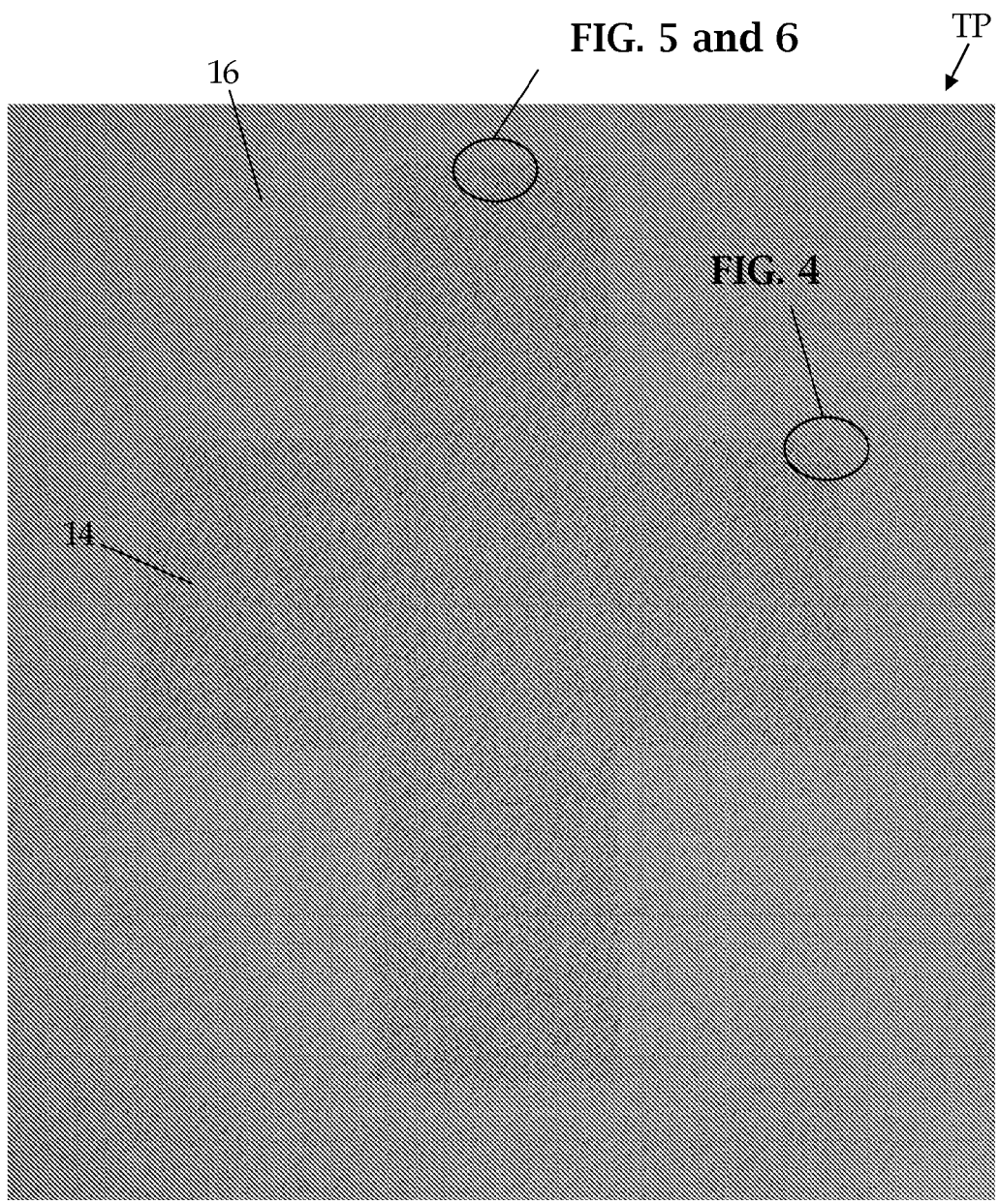
FIG. 3 depicts an embodiment of a test void pantograph after printing and scanning.

As one example, when a 600 dots per inch (dpi) printer is to be used to print the test pantographs TP, 2×2 pixel dots (e.g., making up the foreground 14 as shown in FIG. 3) and 1×1 pixel dots (e.g., making up the background 16 as shown in FIG. 3) may be selected for the dot sizes. The percentage of black ink coverage may be varied by changing the density of dot placement. In order to select the desirable static background 16, multiple densities are tested prior to varying the foreground 14 characteristics. For example, the background 16 ink coverage percentage is tested at different values in the range of 5% coverage to 50% coverage of the total background 16 area. Such characteristics may be tested using a test sheet similar to that described above. It is to be understood that any other variances may be used in subsequent (i.e., staggered) test sheets after a broader-range test sheet is used to hone in on smaller, desirable range(s). In one non-limiting example, the 10% coverage for the pantograph background 16 is a suitable concentration. Such coverage increases brightness (i.e., the perceptual blackness diminishes), but the dots do not completely disappear when copied (printed and scanned), thereby affording a drop-out background suitable for testing the foreground 14 patterns. It is believed that other backgrounds 16 may be suitable as well, depending, at least in part, on the desirable characteristics for the deployed void pantograph 10, 10'.

FIG. 4 illustrates an exploded view of one example of a test pantograph TP, in which both the background 16 (including 1×1 pixel dots) and the foreground 14 (including 2×2 pixel dots) are printed at 10% black dot density. In this particular example, a random dot placement is used to avoid Moiré patterns, etc.

FIGS. 5 and 6 illustrate exploded views of other examples of test pantographs TP, in which different relative concentrations of foreground 14 dots/pixels are used to determine which combination of foreground 14 and background 16 works best with a given printer and scanner (for example, the dot gain after printing on inkjet printers tends to make the dots more similar in size than after printing on laserjet printers, due, at least in part, to ink spread into the paper fibers). In FIG. 5, a 50% higher concentration of black pixels is used for the larger dots (2×2 at 600 dpi) in the pantograph foreground 14 when compared to the smaller dots (1×1 at 600 dpi) in the pantograph background 16. In FIG. 6, the smaller dots have a 50% higher concentration of black pixels than the larger dots.

When generating the test pantographs TP to find the optimum void pantograph 10, 10' characteristic(s) (e.g., densities) for a given printer, any background 16 characteristic may be held constant while one or more foreground 14 characteristics are varied. As one non-limiting example, the background 16 black pixel concentration (e.g., 10% black pixels)

TABLE 1

Example Foreground and Background Pairings for Test Pantographs in a Test Sheet

| (.04, .016) | (.06, .024) | (.08, .032) | (.10, .04)  | (.12, .048) | (.14, .056) | (.16, .064) |
| (.04, .022) | (.06, .033) | (.08, .044) | (.10, .055) | (.12, .066) | (.14, .077) | (.16, .088) |
| (.04, .028) | (.06, .042) | (.08, .056) | (.10, .07)  | (.12, .084) | (.14, .098) | (.16, .112) |
| (.04, .034) | (.06, .051) | (.08, .068) | (.10, .085) | (.12, .102) | (.14, .119) | (.16, .136) |
| (.04, .04)  | (.06, .06)  | (.08, .08)  | (.10, .10)  | (.12, .12)  | (.14, .14)  | (.16, .16)  |
| (.04, .046) | (.06, .069) | (.08, .092) | (.10, .115) | (.12, .138) | (.14, .161) | (.16, .184) |
| (.04, .052) | (.06, .078) | (.08, .104) | (.10, .13)  | (.12, .156) | (.14, .182) | (.16, .208) |
| (.04, .058) | (.06, .087) | (.08, .116) | (.10, .145) | (.12, .174) | (.14, .203) | (.16, .232) |
| (.04, .064) | (.06, .096) | (.08, .128) | (.10, .16)  | (.12, .192) | (.14, .224) | (.16, .256) | may be held constant while the foreground 14 concentration is varied from, for example, 4% to 25% in 1% or less increments (i.e., 40% to 250% as much as the 10% black pixels in the background).

While not discussed herein, it is to be understood that one may also select suitable characteristics for the pantograph foreground 14 and hold such characteristics static while testing various pantograph background 16 characteristics. Still further, both the pantograph foregrounds 14 and the pantograph backgrounds 16 may be varied to determine the most desirable deployment characteristics.

The examples shown in FIGS. 3 through 6 illustrate test pantographs TP in which the foreground 14 specifications do not overlap. It is to be understood, however, that two or more foreground 14 patterns may overlap. As a non-limiting example, a 5% black pixel coverage concentration foreground 14 may be distributed in multiple ranges of two pantographs 10, 10' (or over most of the printed region), and as such, a 10% black pixel coverage concentration will be distributed in portions where the two foregrounds 14 overlap. In this example, the background 16 black pixel coverage concentrations may be 0%, 5% or 10%, depending upon the foreground 14 black pixel coverage concentration. In this example, for the entire printed region, the total foreground black pixel coverage concentration at a particular portion plus the background black pixel coverage concentration at that particular portion equals 10%. In some instances, this helps obscure the void pantograph 10 until copied, i.e., this overlap produces the most desirable pantograph foreground 14, which is covert after printing and overt after scanning. The effectiveness of this overlap approach is variable, depending, at least in part, on the printer, scanner, and substrate (e.g., paper) used.

After each combination of the background 16 and foreground 14 is generated, the test pantographs TP are printed. Any suitable printer may be used, and in some instances, multiple printers may be used. Regardless of the characteristic(s) that remain static or are varied in the various test pantographs TP, the background 16 and foreground 14 combination that, after printing, looks the most similar may be selected as the deployment candidate. In other words, the characteristics that result in a printed test pantograph TP having a foreground 14 that is i) covert or semi-covert prior to scanning and ii) virtually indistinguishable from the background 16 prior to scanning are selected and used to generate the subsequently deployed void pantograph 10, 10'. The similarities between the foregrounds 14 and backgrounds 16 of the test pantographs TP are evaluated or assessed manually (by a human observer) or are scored by an automated (e.g., machine vision) process.

In many instances, the type of printer used to print the test pantograph TP that is selected for subsequent deployment will be selected as the type of printer used for printing the deployed void pantograph(s) 10, 10'. As previously mentioned, the characteristics may vary from printer to printer, and thus in order to achieve the optimal characteristics seen in the test pantograph TP, the same type of printer may be selected for printing the void pantograph(s) 10, 10'. Other factors that are used during the evaluation of the test pantographs TP may also be implemented into the subsequent deployment process. For example, the substrate upon which the selected test pantograph TP is printed may be used in subsequent deployment of the void pantograph 10, 10'.

When evaluating the test pantographs TP, it may also be desirable to scan the test pantographs TP to compare the foreground 14 and background 16 after scanning as well. After scanning, the pantograph foreground 14 is overt, and thus is visibly different from the pantograph background 16. One non-limiting example of a test pantograph TP after printing and scanning is shown in FIG. 3. In this example, after both printing and scanning, the plus sign, "+", in the pantograph foreground 14 becomes patent/overt compared to the pantograph background 16.

After all of the test pantographs TP are printed, and in some instances, scanned, the characteristics of the foreground 14 and background 16 that produce the most desirable test pantograph TP are selected as deployment characteristics for the void pantograph 10, 10'.

At least a portion of the image 12 (e.g., shown in FIG. 2A) is then converted into the void pantograph 10, 10' using the selected deployment characteristics. Converting the image 12 into the void pantograph 10, 10' is accomplished by scanning and transforming the image 12. Transforming the image 12 includes assigning the appropriate pixels of the image 12 to the pantograph foreground 14 and the pantograph background 16, as determined via the previously described filtering process.

When converting the image 12 into the void pantograph 10, 10', the image 12 is filtered into foreground (e.g., generally high-interest (e.g., high-frequency, high-entropy, high-edginess) containing areas) and background areas. The so-marked foreground areas are replaced (overwritten) with the distributed foreground 14 pantograph dots, and the background areas are overwritten with the distributed background 16 pantograph dots.

The generated void pantograph 10 is printed on an object (not shown) as the background of the object. It is to be understood that the term "object" as used herein is to be interpreted broadly and may include, but is not limited to, any type of object, product, document or package. Likewise, the term "package" is to be interpreted broadly herein to include any unit for containing a product, displaying a product, or otherwise identifying a branded good. Non-limitative examples of such packages include boxes, bags, labels, containers, clamshells, bands, tape, wraps, ties, bottles, vials, dispensers, inserts, other documents, or the like, or combinations thereof.

It is to be understood that any normal information printed on the object (e.g., text, pictures, logos, graphics, tables, or the like) is the main payload of the object, and thus makes up the foreground of the object. In an embodiment, the void pantograph 10 printed on the object looks like dots printed in the background (see, e.g., FIG. 2B). The normal information is generally printed on the object such that it does not undesirably obstruct the void pantograph foreground 14 from being read after scanning has occurred. In one embodiment, the normal information is not printed over the void pantograph 10 at all. In another embodiment, the normal information is printed over the void pantograph 10 in a manner such that, after scanning, all or a portion of the void pantograph foreground 14 is distinguishable from both the pantograph background 16 and the object's normal information/foreground.

It is to be understood that steganographic information may be embedded/encoded directly in the void pantograph 10, 10'. Such information is variable, and thus may be different for each void pantograph 10, 10' in a series (e.g., mass serialized). In some embodiments, the steganographic information is authenticating information, security information, or both. The information may be for tracking, branding, or the like, or various combinations thereof. In other embodiments, the information is decoy information meant to mislead an unintended recipient of that information. In still other embodiments, no information is hidden within the void pantograph 10, 10'. As a non-limiting example, watermarks, copy detection patterns, and line/halftoning/Moiré patterns may be scaled and represented in the void pantograph 10, 10'. The information-containing pattern(s) is/are embedded in the void pantograph 10, 10' during its creation. In some instances, the information or a token for the information is incorporated into the image 12 that is used to form the void pantograph 10, 10'.

As an alternative to, or in addition to, encoding steganographic information into the void pantograph 10, 10', another steganographic approach may be utilized with the void pantographs 10, 10' disclosed herein. In this non-limiting example, part (as opposed to all) of the original image 12 may be used during the void pantograph 10, 10' creation. In this embodiment, the part of the image 12 that is not included in the void pantograph 10, 10' may be used to enable a workflow hidden in plain sight on the void pantograph 10, 10'. For example, the portion of the image 12 not utilized in the void pantograph 10, 10' may be stored in a secure registry, and may be linked to both the void pantograph 10, 10' and the object in the registry. When the portion of the image 12 is extracted from the void pantograph 10, 10' (discussed further hereinbelow), the part of the image 12 may be used by someone with access to the original image 12 (in the secure registry) to authenticate the object and enable any workflow associated therewith.

In some instances, for example, when direct human verification or interpretation is desirable, the void pantograph 10, 10' itself is the message. In other instances, the void pantograph 10, 10' itself is not the message, but rather the pattern of the void pantograph 10, 10' is a token, or look-up, to the registry of images held elsewhere. When the void pantograph 10, 10' is analyzed (which is discussed further hereinbelow), the points or regions of interest are determined, and the best match to the points/regions of interest previously identified and stored in the backend registry tells what the void pantograph 10, 10' represents (e.g., token, nonce, look-up, job entry point, workflow key, or the like), and so the associated workflow is instantiated.

After being deployed, the printed region of the object may be scanned at any time. Scanning causes the foreground 14 of the void pantograph 10, 10' to exhibit properties which are visibly distinguishable from the background 16 and the information printed in the object foreground. A non-limiting example of the void pantograph 10' after scanning is shown in FIG. 2C.

After being scanned, the features of the void pantograph 10' may be readily identified with existing segmentation software. As a result of segmentation, the void pantograph 10' is aggregated into usable regions of interest. Segmentation includes thresholding the void pantograph 10', which binarizes it, leaving any ink areas black and any non-ink areas white. Erosion or a thinning process may then be performed on any connected black areas. This process completely erases the small dots of the void pantograph 10' and shrinks, but does not erase, the large dots. Generally, 1-pixel boundary erosion will be sufficient for performing this step, but may vary, depending, at least in part, on the dot sizes (i.e., shapes, orientations, concentrations/percentage-black-coverage, etc.) used in the void pantograph 10, 10'. In some instances, one or more of the smaller dots may not be erased completely, but they will generally not interfere with identifying regions of interest.

After erosion or thinning, the void pantograph 10' is subjected to dilation or fattening. This process returns the larger dots to their original size, but does not reconstitute the small dots that have been erased. Erosion and dilation may be accomplished in each of the x and y direction. For example, erosion of several dot configurations by 1 in each direction may be followed by dilation of the dot configurations by 1 in each direction. It is to be understood that the 2×2 or larger dots remain after the two simple erosions, and regain their original size after the dilation operations.

One or more regions of interest may then be identified or formed with the remaining dots. In one embodiment, run length smearing (e.g., using the square root of the inverse of the black percentage of pixels) is used to cluster the dots left over into their original associated shape(s) or form(s). These shape(s) or form(s) are the region(s) of interest that may be subjected to one or more forms of analysis. In another embodiment, run length smearing is not performed, and the regions of interest are made up of the dilated dots. When run length smearing is not performed, texture analysis may be used to identify the foreground 14 versus the background 16 in the dilated dots, and thus to identify the regions of interest. In another embodiment when run length smearing is not performed, simple dilation/density maps may be used to identify the regions of interest after erosion and dilation.

The region(s) of interest may be analyzed via human evaluation, machine evaluation, or both. Human evaluation generally involves a visual perception of how the region(s) of interest look when compared to the original image. In one embodiment, the person doing the evaluation has access to the original image 12, which may, for example, be stored in a secure registry. In another embodiment, the original image 12 may be overtly printed elsewhere on the object, and thus the visual perception may be made without having to access a secure registry. Generally, one may visually analyze whether the region(s) of interest of the scanned void pantograph 10' look like corresponding regions in the original image 12. Human evaluation may be used to determine whether portions of the original image 12 were intentionally removed from the void pantograph 10, 10' in order to create an overt-to-copy protection bridge, and/or to verify that the object is authentic, and/or to determine whether the void pantograph 10, 10' is variable (i.e., the right part of the void pantograph 10, 10' is variable from one image and/or object to the next).

As mentioned hereinabove, machine evaluation may also be used to analyze the region(s) of interest of the void pantograph 10, 10'. It is to be understood that any type of pattern recognition process that is suitable for analyzing a pattern embedded in the void pantograph 10, 10' (e.g., such pattern being present as a result of the image 12 used) may be used. Machine analysis may be particularly useful when the void pantograph 10, 10' contains specific text, shapes, or glyphs. As one example, if specific text is included in the original image 12, then optical character recognition (OCR) may be performed on the void pantograph 10, 10' region(s) of interest in order to interpret such text. As another example, if a specific shape is included in the original image 12, then shape analysis (such as, for example, Freeman, chain, coding, etc.) may be performed on the void pantograph 10, 10' region(s) of interest in order to interpret such shapes. Shape analysis may be particularly useful in instances where logos or other graphics are used to form the void pantograph 10, 10'. Shape analysis may also be desirable to render the void pantograph 10, 10' more difficult to reverse engineer.

In still another example, glyph analysis may be used to analyze the void pantograph 10, 10'. Glyphs include security-specific marks and patterns, for example, 1D and 2D bar codes. Glyphs may be included in the void pantograph foreground 14, and thus will emerge in response to scanning. The glyphs will be segmented into regions of interest that can be directly analyzed using appropriate security printing and imaging inspection, authentication and/or forensic algorithm(s). Example glyphs that can be included and readily translated (with varying security payload densities, depending on the particular void pantograph instantiation, printer, scanner, and substrate) are 1D, 2D and 3D (multi-gray level) bar codes, modulation transfer function (MTF) targets, graphical alphanumerics (code sets where different glyphs represent different alphanumeric characters), and curvature-based glyphs (e.g., guilloches).

Either human evaluation or machine evaluation may be used to compare the original image 12 (when a user has access to such image 12) to the scanned void pantograph 10' for authentication, detection of intentional changes in the void pantograph 10, 10' consistent with mass serialization, data hiding, or other security related tasks (e.g., the pantograph 10, 10' may be linked to other features printed overtly (i.e., repeating a variable printed area), or to a feature printed covertly (e.g. via UV, IR ink)).

While several embodiments have been described in detail, it will be apparent to those skilled in the art that the disclosed embodiments may be modified. Therefore, the foregoing description is to be considered exemplary rather than limiting.

What is claimed is:

1. A method for generating a void pantograph, the method comprising:
    filtering an image using one or more filters, thereby identifying at least one region for a pantograph foreground and at least one other region for a pantograph background;
    setting static characteristics of at least one of the pantograph background or the pantograph foreground;
    while maintaining the static characteristics of the at least one of the pantograph background or the pantograph foreground, varying at least one characteristic of an other of the pantograph foreground or the pantograph background with respect to the static characteristics of the at least one of the pantograph background or the pantograph foreground to generate at least one test void pantograph;
    printing the at least one test void pantograph;
    assessing similarities between the pantograph foreground and the pantograph background for the printed at least one test void pantograph; and
    selecting deployment characteristics for the pantograph foreground and background based upon the assessment.

2. The method as defined in claim 1 wherein the one or more filters are selected from an edge filter, a color filter, a hue filter, a chroma filter, a saturation filter, a brightness filter, an intensity filter, a luminescence filter, a texture filter, an entropy filter, a graininess filter, a shape filter, a threshold filter, a sharpness filter, a convolution filter, or combinations thereof.

3. The method as defined in claim 1 wherein at least two test void pantographs are printed, wherein one of the at least two test void pantographs is printed with a first printer, wherein an other of the at least two test void pantographs is printed via a second printer that is different from the first printer, and wherein the selected deployment characteristics are further based upon i) which of the first and second printers is to be used for deploying the void pantograph, or ii) a substrate upon which the test void pantographs are printed, or iii) combinations of i and ii.

4. The method as defined in claim 1 wherein setting the static characteristics includes setting the static characteristics of the pantograph background, which further includes:
    selecting a dot size for black pixels within the at least one other region; and
    selecting a concentration of the black pixels within the at least one other region.

5. The method as defined in claim 4 wherein varying the at least one characteristic includes varying the at least one characteristic of the pantograph foreground, which further includes:
    selecting a dot size for black pixels within the at least one region;
    selecting a concentration of the black pixels within the at least one region, thereby generating one of the multiple test pantographs; and
    adjusting the concentration of the black pixels within the at least one region, thereby generating an other of the multiple test pantographs.

6. The method as defined in claim 1 wherein varying the at least one characteristic of the other of the pantograph foreground or the pantograph background includes varying a dot shape, a dot orientation, a dot density, a dot color, a dot distribution method, a dot spacing pattern, or combinations thereof.

7. The method as defined in claim 1 wherein a dot size for black pixels within the pantograph background is 1×1, wherein a dot size for black pixels within the pantograph foreground is 2×2, and wherein a density of the black pixels is varied independently in the pantograph foreground and background.

8. The method as defined in claim 1, further comprising:
    scanning the at least one test void pantograph; and
    assessing whether the pantograph foreground is distinguishable from the pantograph background for the at least one test void pantograph, wherein the selected deployment characteristics are further based upon whether, after scanning, the pantograph foreground exhibits a characteristic that renders it visibly different from the pantograph background.

9. The method as defined in claim 1, further comprising:
    converting at least a portion of the image into the void pantograph using the selected deployment characteristics; and
    deploying the void pantograph on an object, such that both the pantograph foreground and background are at least semi-covert and part of a background of the object.

10. The method as defined in claim 9, further comprising:
    scanning at least a portion of the object, thereby causing the pantograph foreground to become patent;
    segmenting the void pantograph, thereby identifying at least one region of interest; and
    analyzing the at least one region of interest.

11. The method as defined in claim 10 wherein segmenting the void pantograph includes:
    thresholding the void pantograph, thereby binarizing the void pantograph into black and white areas;
    performing erosion of connected black areas, thereby reducing at least some pixels and eliminating at least some other pixels within the connected black areas;
    performing dilation of any remaining pixels; and
    forming the at least one region of interest with the dilated remaining pixels.

12. The method as defined in claim 10 wherein analyzing is accomplished by comparing the region of interest with the image for inspection, quality, authentication, forensics, or combinations thereof.

13. The method as defined in claim 9 wherein a portion of the image is utilized to create the void pantograph, and wherein the method further comprises utilizing the void pantograph and an other portion of the image not included in the void pantograph to authenticate the object.

14. The method as defined in claim 9, further comprising encoding security information into the void pantograph prior to deploying the void pantograph.

15. A system for generating a void pantograph, the system comprising:
- one or more filters to filter a digital image to identify at least one region for a pantograph foreground and at least one other region for a pantograph background; and
- computer readable code, embodied on a non-transitory computer readable medium, the computer readable code for:
    - setting static characteristics of at least one of the pantograph background or the pantograph foreground;
    - while maintaining the static characteristics of the at least one of the pantograph background or the pantograph foreground, varying at least one characteristic of an other of the pantograph foreground or the pantograph background with respect to the static characteristics of the at least one of the pantograph background or the pantograph foreground to generate at least one test void pantograph;
    - printing the at least one test void pantograph;
    - assessing similarities between the pantograph foreground and the pantograph background for the printed at least one test void pantograph; and
    - selecting deployment characteristics for the pantograph foreground and background based upon the assessment.

* * * * *